US008719400B2

(12) United States Patent
Brittenham et al.

(10) Patent No.: US 8,719,400 B2
(45) Date of Patent: May 6, 2014

(54) FLEXIBLE DELEGATION OF MANAGEMENT FUNCTION FOR SELF-MANAGING RESOURCES

(75) Inventors: Peter James Brittenham, Pittsboro, NC (US); David Bruce Lindquist, Raleigh, NC (US); Balan Subramanian, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 12/715,411

(22) Filed: Mar. 2, 2010

(65) Prior Publication Data

US 2011/0219068 A1    Sep. 8, 2011

(51) Int. Cl.
*G06F 15/173* (2006.01)
*G06F 15/16* (2006.01)
*G06F 15/177* (2006.01)
*H04L 12/24* (2006.01)

(52) U.S. Cl.
CPC .......... *H04L 41/046* (2013.01); *H04L 41/0816* (2013.01); *H04L 41/5009* (2013.01); *H04L 41/044* (2013.01)
USPC ............ 709/224; 709/226; 709/218; 709/219

(58) Field of Classification Search
USPC .............. 709/223, 224, 220, 221; 714/25, 48; 717/177
See application file for complete search history.

(56) References Cited

U.S. PATENT DOCUMENTS

| | | | |
|---|---|---|---|
| 7,451,201 B2 | 11/2008 | Alex et al. | |
| 7,490,095 B2 | 2/2009 | Labadie et al. | |
| 7,533,173 B2 | 5/2009 | Badovinatz et al. | |
| 7,542,956 B2 | 6/2009 | Strassner et al. | |
| 7,581,224 B2 | 8/2009 | Remero | |
| 7,590,984 B2 | 9/2009 | Kaufman et al. | |
| 2004/0059966 A1* | 3/2004 | Chan et al. | 714/48 |
| 2005/0086195 A1* | 4/2005 | Tan et al. | 707/1 |
| 2005/0268301 A1 | 12/2005 | Kelley et al. | |
| 2006/0080658 A1* | 4/2006 | Marion et al. | 717/177 |
| 2006/0190482 A1* | 8/2006 | Kishan et al. | 707/103 Y |
| 2006/0294238 A1 | 12/2006 | Naik et al. | |
| 2007/0203871 A1* | 8/2007 | Tesauro et al. | 706/53 |
| 2007/0245004 A1* | 10/2007 | Chess et al. | 709/223 |
| 2007/0271276 A1 | 11/2007 | Allen et al. | |
| 2007/0282778 A1 | 12/2007 | Chan et al. | |
| 2008/0027959 A1 | 1/2008 | Coha | |
| 2008/0059972 A1* | 3/2008 | Ding et al. | 718/105 |
| 2008/0077689 A1 | 3/2008 | Brittenham et al. | |
| 2008/0109679 A1* | 5/2008 | Wright et al. | 714/37 |
| 2008/0222183 A1* | 9/2008 | Petri | 707/102 |

(Continued)

OTHER PUBLICATIONS

Dakshi Agrawal, et al.; Policy-based Management of Networked Computing Systems;IEEE Communications Magazine, v43, n 10, 69-75, Oct. 2005.

(Continued)

*Primary Examiner* — Joseph E Avellino
*Assistant Examiner* — Aftab Nasir Khan
(74) *Attorney, Agent, or Firm* — Grasso PLLC; Fred Grasso

(57) ABSTRACT

Included are method, article of manufacture, and device that serve to identify the status of a network resource along with whether the network resource is a self-managing resource. When autonomic management capabilities are identified, an autonomic management rule for management of the network resource may be generated and sent, over a network, for receipt and use by the identified self-managing resource.

17 Claims, 5 Drawing Sheets

(56) References Cited

U.S. PATENT DOCUMENTS

| | | |
|---|---|---|
| 2008/0282243 A1 | 11/2008 | Seguin |
| 2009/0049166 A1* | 2/2009 | Roman et al. ................. 709/223 |
| 2009/0119390 A1* | 5/2009 | Donatelli et al. ............. 709/221 |
| 2010/0011098 A1 | 1/2010 | Sanborn et al. |
| 2011/0191460 A1* | 8/2011 | Sailhan et al. ................ 709/224 |

OTHER PUBLICATIONS

Gerald Tesauro, et al.; A Multi-Agent Approach to Autonomic Computing.

* cited by examiner

FLEXIBLE DELEGATION OF MANAGEMENT FUNCTION FOR SELF-MANAGING RESOURCES

BACKGROUND

The field of invention involves autonomic management of resources in or across networks. More specifically, delegation or retrieval of autonomic management functionality to or from self-managing resources which provide services in or across networks.

Autonomic management regards systems or devices that have the ability to self-manage, i.e., manage their own function, operation, output, etc. Autonomic management within or among networks refers to the self-managing characteristics of distributed networks. These self-managing characteristics can include adapting to unpredicted changes inside of or outside of the network. These changes may be made without demonstrating the intrinsic complexity for making the adaptations to operators or users of the networks. An autonomic management system (AMS) of a network makes decisions on its own, using high-level policies or rules or standards. These AMSs may monitor and optimize network resources and automatically adapt themselves and the managed resources to changing conditions.

An autonomic computing framework can be composed of Autonomic Components (AC) interacting with each other. An AC may contain two main control loops (local and global) with sensors (for self-monitoring), effectors (for self-adjustment), and planers/adapters for exploiting policies based on self- and environment awareness. In some autonomic computing frameworks, central managers may also be used to carry out fixed functions with predefined and static relationships. Also, peer-to-peer frameworks may be employed with fixed functionality, and predefined and static relationships between peer managers and components.

BRIEF SUMMARY

As described herein, the invention may be embodied in various forms, including systems, devices, methods, and articles of manufacture. The embodiments provided herein are illustrative and not limiting, and may be adapted in-part or combined, all while staying within the spirit and scope of the invention.

In embodiments, knowledge and code incorporated into localized rules for interpreting data may be used to provide dynamic and changeable management functionality in autonomic systems and resources. The autonomic management functionality may be dynamically moved from hierarchical-management, to peer-management, to self-management to account for capabilities or functionality of network resources. Loads and demands placed on the network resources may be considered when the autonomic functionality is evaluated, distributed, and employed. The autonomic functionality may be transported between and among Autonomic Managers (AM) and Self Managing Resources (SMR) using Autonomic Management Rules (AMRs) configured by or for the AM. The AMR functionality may be moved and carried out locally, at a resource, when data or operations are local, by a peer of a resource, or even by an AM during select network scenarios. The AMRs may include both code for carrying out action and knowledge or information useful in evaluating situations, gaining understanding, and processing actions.

In embodiments, when autonomic management rules are carried out, meta-instructions, local-instructions, data-flows in the network or the resources, and prior management function movement may be considered when defining and allocating AMRs. In embodiments, localized rules, which consider and account for localized sensed conditions and contain knowledge or information and code, may be packaged into individual AMRs or split into several identical AMRs, in order to enable autonomic management at the local-level. Self-managing resources, which receive and use the AMRs may also be chained together to reduce duplicative management responsibilities. In other words, related SMRs may receive a single AMR and use that across each chained SMR. The SMRs may be chained together for other reasons as well. In embodiments, the autonomic management functionality responsibility may toggle between a resource and a delegating management system. This toggling back and forth may be managed using the AMR and may be in consideration of network demands, data flow, resource availability, or other criteria.

In embodiments, autonomic resources may accumulate AMRs and build self-management capability apart from centralized system managers. This self-management capability may be shared with peer resources apart from the centralized system manager and may be used when the resource has access to the network or is cut-off from the network for a period of time or by design.

Thus, embodiments include various dynamic autonomic management scenarios where autonomic management is retained or delegated to and from resources of a network. The embodiments can include network devices, systems, methods, and computer readable medium. The network devices may include a controller programmed with instructions that cause it to carry out all or portion of, the AMR functionality. Embodiments may also include a method wherein operating instructions at a controller cause one or more other controllers to carry out all, or portions of, the AMR functionality. Likewise, embodiments may also include computer readable storage medium having stored thereon instructions, which, when executed by a controller, cause the controller to carry out all, or portions of, the AMR functionality.

DETAILED DESCRIPTION

Figure 1:
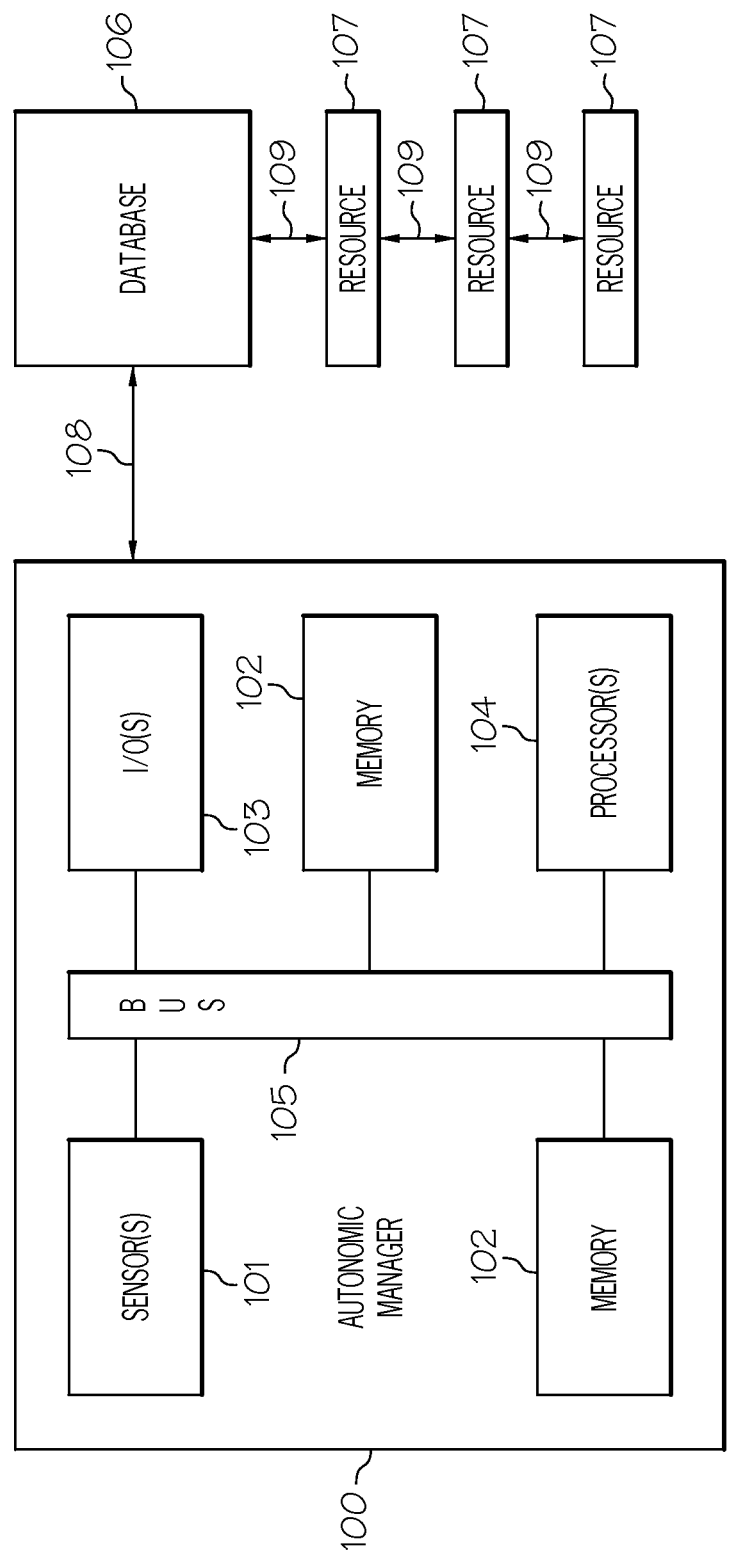
FIG. 1 shows an autonomic manager in communication with a database and several resources in accord with embodiments.

Various embodiments of flexible delegation of management function for Self-Managing Resources (SMR) are provided herein. The invention may be reflected in these embodiments, portions of these embodiments, combinations of these embodiments, and other embodiments as well.

As explained herein, embodiments include the distribution or redistribution of management policies, standards, rules, triggers or tests for independent execution or review by Autonomic Managers (AMs) or Self-Managed Resources (SMRs). In embodiments, an Autonomic Manager may be repeatedly reviewing its management oversight and actions with respect to each of the resources or components it manages as well as reviewing its internal management function for self-optimization. This review and analysis may include considering data sources/sensors over the network, resource load indications, and Service Level Agreements (SLAs) that identify minimum performance thresholds or triggers. When an AM identifies or concludes that a pattern exists, a load is improper, or an SLA is not being met, or some other trigger criteria exists, the Autonomic Manager may automatically take steps to identify the relationship and interdependencies of the data sources that led to the identification or discovery of the trigger. Autonomic Management Rules (AMRs) may then be generated or modified by the AM. The AMR may define management rules, policies, or standard to be executed rules to be executed by or on behalf of a resource or application in order to accommodate the data or the trigger. The AMRs may include both code for carrying out action and knowledge or information useful in evaluating situations, gaining understanding, and processing actions.

Of interest to the AM, when determining whether to generate or modify an AMR, may be actions or work conducted on corresponding resources. In other words, identical or corresponding resources may share or take responsibility for their management based upon analysis conducted by the AM, and the AMR generated and sent to the resources. As part of the generation or evaluation of the AMR at the AM, the relationship between the resource from which data was received, and the resource on which action is taken with the data, may be studied. In addition, the AM may be in communication with a Change and Configuration Management Database CCMDB. The CCMDB may store versions of the AMRs as well as data being sent over the network. By storing old data and AMRs at the CCMDB or elsewhere, the AM may take into account both real-time considerations and historic trends and occurrences when developing or amending AMRs.

In embodiments, the AM may bundle AMRs based on established relationships and localization of resources. In other words, like resources or resources with similar functionality or location may be bundled to receive similar AMRs or be controlled by application of a single AMR by one of the peer resources in the defined bundle. The AMRs may be bundled by their use of similar internal code and well as similar knowledge or information as well.

FIG. 1 shows an Autonomic Manager 100 ("AM") in accord with embodiments. The AM 100 is shown as containing a bus 105, one or more Sensors (101), memory 102, one or more input/outputs 103, and one or more processors 104. The AM 100 is also shown in communication with database 106 and resources 107. In use, the AM may receive instructions through the I/O 103 which, when run or stored in memory 102, cause the AM to review network data or data flows and generate or modify Autonomic Management Rules ("AMRs") stored on the database 106 and used by one or more of the resources for autonomic management. The AMRs may provide rules or instructions that may be used by the resources for self-management and for management of other resources or applications. The scope of the management may include power settings and limitations, memory settings, service offerings, and other variables of the resource or applications being managed.

The resources 107 may include a wide range of network resources including printers and servers, as on a computer network, relay stations and transformers, as on a power grid network, and traffic signals, as on a traffic grid network. The resources may also include applications run on the resources that create virtual resources. In other words, an application run on a resource that creates a partitioned network server may also become self-managing in embodiments. Also, the network of embodiments may include various kinds of networks including wide-area networks, cloud networks, and local networks.

In some embodiments, the AM 100 may notify an administrator who may manually setup or modify AMRs. After this manual intervention, the AM may then push the AMRs or bundles of AMRs out to the appropriate resources. When AMRs or bundles of AMRs are sent by the AM, subscriptions for the resources may also be changed to reflect the new or revised AMRs. These subscriptions may be data subscriptions or other requests made and satisfied over a network.

Figure 2:
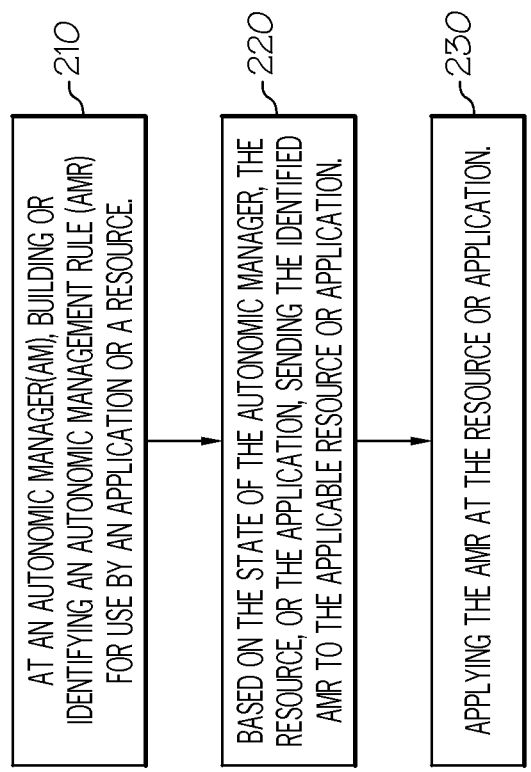
FIG. 2 is a flowchart of a method employing an Autonomic Manger in accord with embodiments.

FIG. 2 shows a method that may be employed in embodiments. In FIG. 2, box 210 describes how an embodiment may include, at an AM, building or identifying an Autonomic Management Rule for use at a resource. Then, at 220, based on the state of the AM, sending the AMR to the applicable resource or application. The method of FIG. 2, as described at 230, may also include applying the AMR at the resource or application. In other words, upon receipt of the AMR, the resource or application to which the AMR is sent, may apply the management rules contained in the AMR. These rules may include the power cycling of the resource, the throughput of the resource, and other functionality performed by the resource. In embodiments, actual execution of an operation consistent with the received AMR may previously have been the function of the resource and not of the AM. In this embodiment, the abstraction is preferred because it enables the AM to use management function of the AMR closer to the resource itself without requiring the AM to change components of the data itself.

As shown at 220, an AM may delegate management function to a self-managing resource in various situations, including: (a) when the data and actions are localized to the resource; (b) when, over time, the AM recognizes that many of the incidents at the resource reported by the data are transient or are unrecoverable by the time the AM has received the indications and can act on them, e.g., network lags making the management corrections useless; (c) when the operational load of the SMR is below normal and results in under-utilization.

Figure 3:
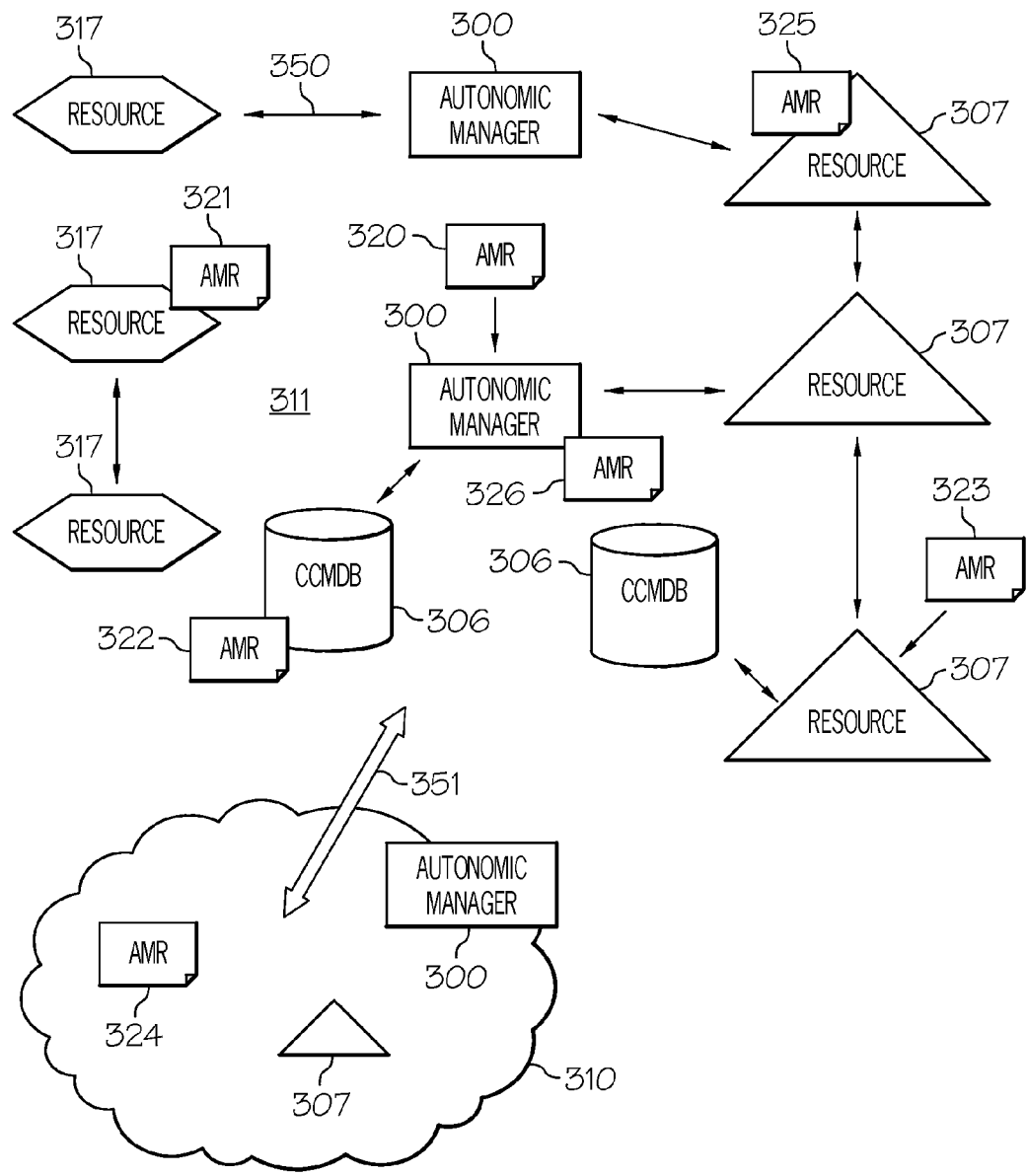
FIG. 3 shows two networks employing Autonomic Managers, in accord with embodiments.

FIG. 3 shows adjacent networks employing Autonomic Managers in accord with embodiments within and between the networks. FIG. 3 includes network 310, network 311, resources 307, resources 317, Autonomic Management Rules (AMRs) 320-326, Autonomic Managers (AMs) 300, and Change and Configuration Management Database 306 ("CCMDB"). The devices described in this embodiment may include or perform instructions consistent with the discussion herein. This includes monitoring data in networks 310 and 311, generating and amending AMRs using the data and applying the AMRs at one or more resources.

As can be seen in FIG. 3, the AMRs may be resident at a resource, as shown with AMR 321 and 325, the AMRs may be sent between resources as shown with 323, and the AMRs may be stored or used at the AMs 300 and the CCMDBs 306, which is shown at 322 and 326. Also evident from FIG. 3 is that the AMs may communicate across networks. Here, networks 310 and 311 are shown ready to exchange AMRs. This exchange of AMRs across networks may include embodiments where the resources are performing similar functions or are running similar applications. In embodiments, whether sent within or between networks, AMRs or partial AMRs may be sent and used by the resources or applications to reduce overhead in the networks or promote other efficiencies.

Figure 4:
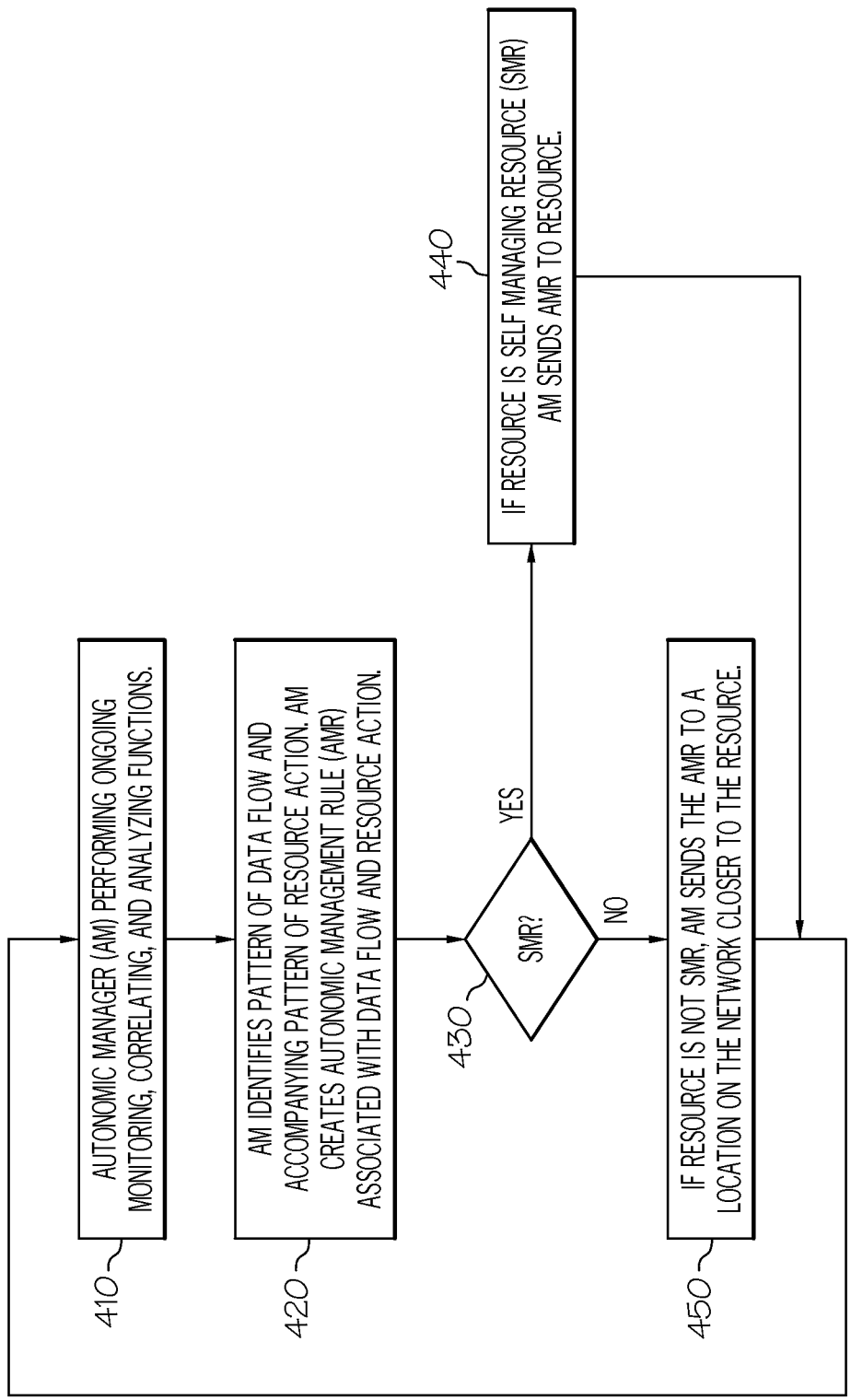
FIG. 4 is a flowchart of a method employing an Autonomic Manager in accord with embodiments.

FIG. 4 shows a method in accord with one or more embodiments. The method of FIG. 4 includes, at 410, an AM performing ongoing monitoring of a network, resource, subscription, etc. This ongoing monitoring may include analyzing and correlating data sent across and through the network. At 420, the AM may identify a pattern of data flow and an accompanying pattern of resource action based on the data flow. Upon identifying this pattern, the AM may create an AMR associated with the data flow and one or more resource actions. This AMR may include various management functions including the allocation of memory to data storage, the prioritization of the tasks within a resource, and the accessibility of the resource over a network. As noted at 430, upon determining whether a targeted resource is a Self-Managing Resource (SMR), the AMR may be sent to the resource or the AMR may be sent to a location near the resource that can accept the AMR. This nearby location may be an AM or an SMR. In either instance the receiving resource may accept the AMR and take on management functions for the resource. The arrow 460 shows that monitoring may continue by the AM after an AMR is sent and applied by an SMR or another AM on the network.

Figure 5:
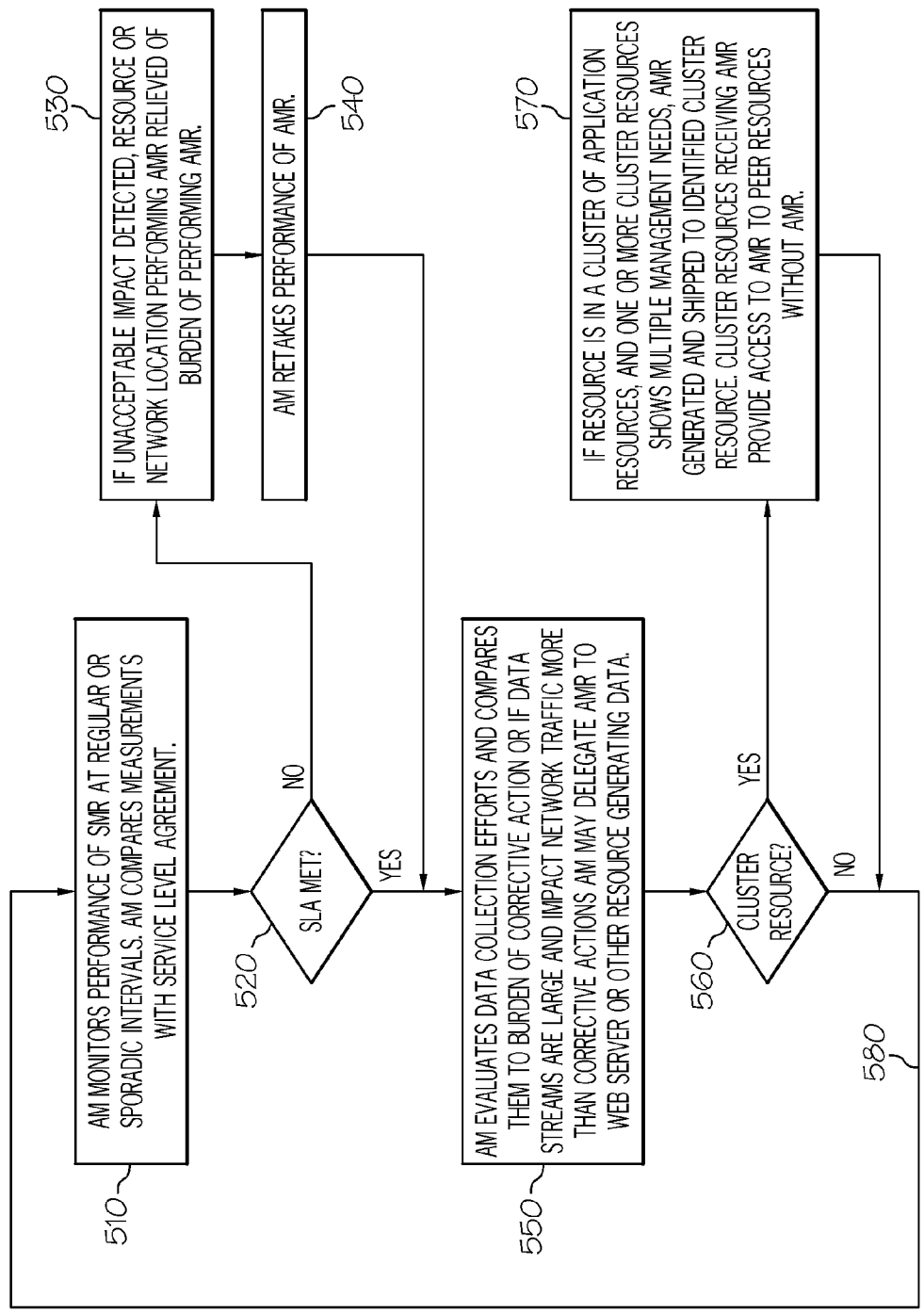
FIG. 5 is a flowchart of a method employing an Autonomic Manager in accord with embodiments.

FIG. 5 shows another method in accord with one or more embodiments. At 510, the AM may monitor performance of an SMR at certain intervals, either periodic or random. This performance may be compared to standards set in a Service Level Agreement (SLA). If the SLA is met, the AM may evaluate data as shown in 550. If the SLA is not met, the AM may adjust the management functions performed by the resource or network location. This may include the AM retaking responsibility for the particular AMR, as shown at 540. After the SLA is evaluated, at 550, whether or not it is met, the AM may evaluate data collection efforts and the associated burden for such collection and, if the burden is too onerous, take corrective action. This corrective action may include delegation of management responsibilities. Afterward, the AM may evaluate whether a resource is part of a cluster of resources, and, if so, generate and send AMRs for use by the cluster or peers of the cluster. After considering whether a resource is part of a cluster at 560, the monitoring may continue, as shown by return arrow 580.

In embodiments, the delegation of data flow may include some or all of the following. The AM may recognize that some management function is localized at a resource or other network location. A query of the resource, to evaluate if it provides self-management capability may be completed. If the resource is an SMR, an AMR used by the SMR to manage itself may be generated and sent. In some instances, the AM may reduce its load by having the data provided to the SMR itself. This may include updating subscriptions for the data. The SMR may also update subscriptions to optimize or reduce the network traffic.

In embodiments, peers resources may collaborate to improve management function. Here, an AM may notice a relationship with the data collected the use of that data. If so, the AM may select an SMR to manage/monitor the other resource. Also, in an n-tiered architecture the interdependencies among the tiers may be leveraged for management where SMRs may be able to monitor their peer loads and select which peer should be a manager for a particular indicator or service level agreement. As to delegation, embodiments may include code to execute the self-management functions (or actions) and rules to determine when to execute the self-management actions.

In a specific example, an Autonomic Manager (AM) may be responsible for managing a set of resources that include a set of application servers and a database. The AM may detect a situation where indicators from the application server result in corrective actions taken by the same application server. From this, the AM may determine that the application server has self-managing capabilities. An AMR may then be built, with the rules to be delegated to the application server, as well as any actions that should be taken when a test is not met. The AM may download the AMR to the application server, which may then process it, using its self-managing capability. After downloading it, the AM may monitor the application server to ensure that its performance is not impacted by the self-management processing. At the same time, other application servers that are in a cluster of servers, may also obtain the rules and tests from the first application server that received them.

In this example, the AM may recognize that for some rules the data collection operations are less intensive (and less frequent) but the corrective actions are lengthy. The AM may also recognize that the data streams are large and impact network traffic more than the corrective actions. In either instance the AM may adjust the AMR in order to accommodate either finding and send the updated AMR to the resource instead. In certain situations, the AM may send the AMR to the SMR to delegate the AMR to the SMR.

In certain embodiments, as mentioned, the AM may regain management function of a resource. Operational load of the resource may be too high to justify management function being executed on the resource itself. Also, if a particular piece of AMR is no longer useful it may be retrieved. In other words, embodiments not only include retrieving ineffective AMRs but also retrieving portions of AMRs as well.

In embodiments, when an AM identifies that AMRs, whose monitoring and actions correspond to only one domain or application or resource, exist, these AMRs may be pushed down to the applicable resource. For other efficiencies, as noted, rules may be bundled and an AM may automatically split up AMRs into individual bundles and push them down to different resources being managed. Triggers may also be used. In other words, when a trigger is satisfied, the AM may send an AMR to a resource. For example, if there is an opportunity for a management function to be done in the SMR, an AM may push it down there but may choose to pull it back as needed, should a trigger only be periodically satisfied.

In embodiments, the data sources/sensors, from which the data is being collected for a particular correlation, may be screened for actions that occur on the same resource as the one that sent the data that triggered the action. If the action is being taken on another resource, the relationship between the resource from which the data was received and the one on which the action is being taken is studied using data in the CCMDB. Whether this relationship is static or relatively consistent over some amount of time, analyzing data from the CCMDB may also be taken into account.

In embodiments, the AM may notify an administrator to setup new AM policies, rules, or standards. Once these policies, rules or standards are setup, the administrator may provide their details to the AM, which may then push bundles of AMRs out and perform activities as above.

As noted, in embodiments, the AM may delegate management function to an SMR when the data and actions are localized to the resource; when over time, the SMR recognizes that many of the incidents reported are transient and either go away or are unrecoverable by the time, the AM has received the indications and has acted on them (network lags make the management useless); and when the operational load of the SMR is below normal and results in under-utilization.

As also noted, the AM can regain management function of a resource when operational load of the resource is too high to justify management function being executed on the resource itself; when a particular rule is no longer useful; and when the AM recognizes that some management function is localized. When a function is localized, the AM may query the resource to see if it provides self-management capability, through a Web Services Distributed Management ("WSDM") metadata exchange for example. The AM may then update the data used by the SMR to manage itself and redirect a monitoring component to provide data to the resource itself. The SMR may then complete some optimization to reduce the network traffic and setup internal data feeds.

As another example, in embodiments, the AM may recognize that for particular AMRs, the data arrives from application server and the action always happen on the application server. The AM may create or amend an AMR and locate it on the network closest to application server. The AMR may then instruct the application server to send the set of monitoring data that drive those AMRs to the new AM instance. The AM may check if the resource is a self-managing resource and if so, bundle the AMRs and their actions to send them over to an Autonomic Server. It then monitors the performance impact of the delegation at regular intervals. If the impact is excessive or the AM recognizes a drop in performance of the resource, the AM may instruct the resource to stop executing the rules and regain that responsibility. The actual AMRs resident in resource may just be deactivated or removed all together. The AM may also recognize, that for some rules, the data collection operations are less intensive (and less frequent) but the corrective actions are lengthy and that the data streams are huge and impact network traffic more than the corrective actions. In these instances, the AM may chance the location of the execution of the AMR.

Also, the application server may be a tiered cluster of servers, and a certain server show multiple management needs, the AMR required for those needs may be bundled. Later, when the same issue arises on a different server, that server may be able to access the AMR from an Autonomic Server (AS) that is self-managing those issues. Web Services Distributed Management ("WSDM") may be used to construct these like service groups.

Thus, in embodiments, a network resource may become an autonomic manager for its peers on selection by the original autonomic manager that is managing the network resource and its peer resources. Likewise, the network resources may be able to share the autonomic management rules they have for autonomic management (sent to it by an autonomic manager) with peer network resources that are similar. These similarities can be discovered or expressed by the network resource in the fashion of signals or exchanges such as: "I can host an app," "I can route network packets," "I can be configured with parameter x," etc.

In embodiments, when deciding how to delegate, a higher level autonomic manager may be continually evaluating data sources and sensors, information for particular detections, and policies. The data sources/sensors from which the data may be collected for a particular correlation may be analyzed by the autonomic manager to identify the relationship and interdependencies of the data sources. The information that may be used for particular detections and deductions may also be analyzed. Likewise, as to the policies, these may also be evaluated for particular evaluations that occur due to the triggering of particular rules or the arrival of data from particular resources is studied and analyzed.

Triggers and points of analysis may include considering actions that happen on the same resource as the one that sent the data that triggered the action. Here, if the action may be taken on another resource, the relationship between the resource from which the data was received and the one on which the action is being taken may be studied using data in a CCMDB. Also, whether this relationship is static or relatively consistent over some amount of monitoring of the CCMDB may also be taken into account.

In embodiments, after conducting the above analysis, a set of symptoms may be identified and a particular set of actions may be identified for a particular set of network resources. Also, an autonomic manager carrying out some of this functionality, may automatically partition information and bundle together symptoms, actions etc. that may be used and considered.

Throughout the application, the information being exchanged in the AMRs may include instructions for management and knowledge. These instructions may include actions while the knowledge may include symptoms, specific metric values, related policies/evaluation conditions, and actions.

In embodiments an autonomic manager may create new autonomic manager instances for groups of network resources. These groups may be provisioned separately. Also, a network resource may be chosen to also play this role and do peer management, notifying an administration/human to set up this instance vs. automatically creating it. In any case, continuing to monitor the newly created instances and establishing communication between created instance and the parent autonomic manager that actually creates it may be performed in embodiments.

In embodiments, the AM may delegate management function to the SMR. This may be done when the data and actions are localized to a resource. For instance, when, over time, it recognizes that many of the incidents reported are transient and either go away or are unrecoverable by the time, the AM has received the indications and has acted on them (network lags make the management useless), i.e. when just-in-time management is required. Still further, when the operational load of the SMR is below normal and results in under-utilization, the AM may delegate as well.

In embodiments, the AM can regain management function of a resource as well. This may occur when the operational load of the resource is too high to justify management function being executed on the resource itself. For instance, when a particular piece of knowledge, and any corresponding management function, is no longer useful at the resource.

In embodiments, the AM may be able to push down the capability implementation required to execute a particular set of management operations to the SMR when it is delegating some management function to the SMR. This deployment may be flexible in nature. In other words, the code to execute a management function may be made available on a system when the management knowledge is available on that system. As and when the delegation occurs, the AM may be permitted to ship new management code to the SMR and also remove it when it is no longer useful. This may also happen when the AM recognizes that the symptoms that lead to the use of a management function are no longer occurring in a certain system or network.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited to the particular use contemplated.

What is claimed is:

1. An autonomic management device comprising:
a bus;
memory coupled to the bus; and
a microprocessor coupled to the bus, wherein the microprocessor is programmed to
randomly or periodically monitor one or more network resources for detecting an anomaly with subscription or performance criteria associated with the one or more network resources wherein the network resource is either an autonomic manager or a self-managing resource of the network;

identify a real-time and historic pattern of data flow sent across the network and accompanying real-time and historic patterns of resource action based on the data flow;

after identifying the pattern of data flow and the accompanying pattern of resource action based on the data flow, generate an autonomic management rule for management of the network resource based on detecting an anomaly with a monitored resource, where detecting includes evaluating autonomic manager resource load indications or Service Level Agreement (SLA) minimum thresholds, or pattern existence, or improper load, or level of SLA is not being met;

determine whether a monitored resource is a resource in a cluster of application resources;

the autonomic management rule comprising instruction code;

the autonomic management rule being dynamically moveable from hierarchical management resources, to peer-management network resources, to self-management network resources;

the autonomic management rule includes at least one or more of: instructions for storage allocation, or task prioritization, or subscription of a resource over the network;

the autonomic management rule associated with the identified real-time and historic pattern of data flow and the accompanying real-time and historic pattern of resource action based on the data flow; and, after identifying the status of the network resource, send the autonomic management rule, over the network, for receipt by the network resource or to a location that can accept the autonomic management rule near the network resource.

2. The autonomic management device of claim 1 wherein the microprocessor is further programmed to retrieve, for execution, an autonomic management rule from a network resource, and execute the autonomic management rule and identify the status of a network resource.

3. The autonomic management device of claim 1 wherein the instructions generated for the resource to execute are executed by the resource when the resource has network access and does not have network access.

4. The autonomic management device of claim 1 wherein the autonomic management rule is sent from a first network with the microprocessor, to a second network with a network resource and without the autonomic manager.

5. The autonomic management device of claim 1 wherein the microprocessor is further programmed to bundle resources that share one or more functions into a group, wherein, after identifying the status of the network resource, the autonomic management rule is sent to a resource in the group.

6. The autonomic management device of claim 1, further programmed to:

retrieve from a database, stored autonomic management rules and data; and compare the retrieved autonomic management rules and the data with data extracted from data flows in a network.

7. The autonomic management device of claim 1 wherein the autonomic management rule comprises code for power settings and limitations, memory settings, prioritization of tasks within a network resource, and service offerings for a network resource.

8. The autonomic management device of claim 1 further programmed to change one or more subscriptions to a network resource when sending an autonomic management rule or a bundle of autonomic management rules.

9. The autonomic management device of claim 1 further programmed to: monitor an application server to determine whether or not its performance is impacted by self-management processing.

10. The autonomic management device of claim 1 further programmed to: instruct a self-managing network resource to stop executing autonomic management rules when the processor recognizes a decrease in performance of the self-managing network resource; and regain responsibility for management of that self-managing network resource.

11. The autonomic management device of claim 1 wherein the real-time and historic patterns of data flow comprises one or more of the following:

a relationship between the resource from which data was received and the resource on which action is taken, or a subscription made and satisfied over the network, or a subscription requests made over the network, or data collection and the associated burden for collection, or data collected and the associated use of the data, or the size of a data stream and its impact on network, or the size of a data stream and its impact on network traffic as compared to corrective action.

12. A nontransitory article of manufacture comprising:

a nontransitory computer readable medium, the medium containing instructions, which when executed, cause a microprocessor to identify the status of a network resource and whether the network resource is a self-managing resource, determine whether a monitored resource is a resource in a cluster of application resources, randomly or periodically monitor one or more network resources for detecting an anomaly with subscription or performance criteria associated with the one or more network resources wherein the network resource is either an autonomic manager or a self-managing resource;

identify a real-time and historic pattern of data flow sent across a network and accompanying real-time and historic patterns of resource action over the network;

after identifying the pattern of data flow and the accompanying pattern of resource action, generate an autonomic management rule for management of the network resource based on detecting an anomaly with a monitored resource, where detecting includes evaluating autonomic manager resource load indications, or Service Level Agreement (SLA) minimum thresholds, or pattern existence, or improper load, or level of SLA is not being met;

the autonomic management rule comprising instruction code;

the autonomic management rule being dynamically moveable from hierarchical management resources, to peer-management network resources, to self-management network resources;

the autonomic management rule including at least one or more instructions for storage allocation or task prioritization, or subscription of a resource over the network;

the autonomic management rule associated with the identified real-time and historic pattern of data flow and the accompanying real-time and historic pattern of resource action; and after identifying the status of the network resource, send the autonomic management rule, over a network, for receipt by the network resource or for receipt nearby the network resource.

13. The article of manufacture of claim 12 wherein the instructions also cause a microprocessor to retrieve, for execution, an autonomic management rule from a network resource, and execute the autonomic management rule.

14. The article of manufacture of claim 12 wherein the instructions also cause a microprocessor to send autonomic management rules from a first network with the microprocessor, to a second network, with a network resource that is a self-managing resource.

15. The article of manufacture of claim 12 wherein the instructions also cause a microprocessor to bundle resources that share one or more functions into a group, wherein, after identifying the status of the network resource, send the autonomic management rule to a resource in the group.

16. The article of manufacture of claim 12 wherein the instructions also cause a microprocessor to:
retrieve from a database, stored autonomic management rules and data; and
compare the retrieved autonomic management rules and the data with data extracted from data flows in a network.

17. The article of manufacture of claim 12 wherein the medium contains further instructions, which when executed cause the microprocessor to:
monitor performance of a self-managing resource and compare this monitored performance to a standard set in a service level agreement, and
if the service level agreement standard is not met, adjust the management function performed by the self-managing resource or retake management responsibility for the self-managing resource.

* * * * *